United States Patent
Kuo (10) Patent No.: US 10,686,360 B2
(45) Date of Patent: Jun. 16, 2020

(54) POWER CONTROL CIRCUIT AND A POWER CONTROL METHOD

(71) Applicant: Quanta Computer Inc., Taoyuan (TW)

(72) Inventor: Hsin-Chih Kuo, Taoyuan (TW)

(73) Assignee: QUANTA COMPUTER INC., Guishan Dist., Taoyuan (TW)

( * ) Notice: Subject to any disclaimer, the term of this patent is extended or adjusted under 35 U.S.C. 154(b) by 0 days.

(21) Appl. No.: 16/410,281

(22) Filed: May 13, 2019

(65) Prior Publication Data

US 2020/0136495 A1      Apr. 30, 2020

(30) Foreign Application Priority Data

Oct. 25, 2018   (TW) .............................. 107137658 A (51) Int. Cl.
| | |
|---|---|
| *H02M 1/08* | (2006.01) |
| *G06F 1/28* | (2006.01) |
| *H02M 3/156* | (2006.01) |
| *G06F 1/3206* | (2019.01) |
| *H02M 1/00* | (2006.01) |

(52) U.S. Cl.
CPC ................ *H02M 1/08* (2013.01); *G06F 1/28* (2013.01); *G06F 1/3206* (2013.01); *H02M 3/156* (2013.01); *H02M 2001/0054* (2013.01)

(58) Field of Classification Search
CPC ............ H02M 1/08; H02M 1/36; H02M 1/32; H02M 3/156; H02M 3/158; H02M 3/335; H02M 3/33507; H02M 3/1584; H02M 3/33561; H02M 2001/0025; H02M 2001/322
See application file for complete search history.

(56) References Cited

U.S. PATENT DOCUMENTS

| | | | | |
|---|---|---|---|---|
| 4,271,460 A | * | 6/1981 | Baker ..................... | H02H 7/125 323/901 |
| 6,903,946 B1 | * | 6/2005 | Wu ....................... | H02M 1/4225 363/65 |
| 7,023,716 B1 | * | 4/2006 | Wu .......................... | H02M 1/42 323/222 |
| 8,836,386 B1 | * | 9/2014 | Hwang .................. | H03K 17/22 327/143 |
| 9,941,783 B2 | * | 4/2018 | Kuo ........................ | H02M 1/36 |

(Continued)

*Primary Examiner* — Thienvu V Tran
*Assistant Examiner* — Nusrat Quddus
(74) *Attorney, Agent, or Firm* — McClure, Qualey & Rodack, LLP (57) ABSTRACT

A power control circuit includes a detection device, a first control device, and a second control device. When the detection signal is changed from lower to higher than the first voltage, the first control device's output is changed to the second potential. When the detection signal is changed from higher to lower than the second voltage, the first control device's output is changed to the first potential. When the detection signal is changed from lower to higher than the third voltage, the second control device's output is changed to the fourth potential. When the detection signal is changed from higher to lower than the fourth voltage, the second control device's output is changed to the third potential. According to the first or second potentials, the circuit device turns on/off the first function. According to the third or fourth potentials, the circuit device turns on/off the second function.

5 Claims, 9 Drawing Sheets

(56) References Cited

U.S. PATENT DOCUMENTS

| | | | | |
|---|---|---|---|---|
| 10,447,140 B1* | 10/2019 | Kuo | .................. | H02M 1/08 |
| 2003/0001643 A1* | 1/2003 | Glenn | .................. | H04L 25/06 |
| | | | | 327/205 |
| 2005/0189970 A1* | 9/2005 | Nakatake | .................. | H03L 7/08 |
| | | | | 327/143 |
| 2011/0095814 A1* | 4/2011 | Kim | .................. | G11C 5/14 |
| | | | | 327/538 |
| 2012/0049820 A1* | 3/2012 | Moussaoui | .................. | H02M 1/36 |
| | | | | 323/282 |
| 2012/0187997 A1* | 7/2012 | Liao | .................. | H05B 33/0815 |
| | | | | 327/299 |
| 2013/0194037 A1* | 8/2013 | Takahashi | .................. | H03F 1/32 |
| | | | | 330/3 |
| 2014/0368741 A1* | 12/2014 | Joo | .................. | H02M 1/32 |
| | | | | 348/730 |
| 2015/0326123 A1* | 11/2015 | Fukushima | .................. | H02M 3/158 |
| | | | | 323/271 |
| 2017/0201181 A1* | 7/2017 | Yabuzaki | .................. | H02M 1/12 |
| 2017/0366043 A1* | 12/2017 | Tu | .................. | H02J 7/0068 |
| 2018/0034380 A1* | 2/2018 | Chen | .................. | H02M 1/32 |

* cited by examiner

POWER CONTROL CIRCUIT AND A POWER CONTROL METHOD

CROSS REFERENCE TO RELATED APPLICATIONS

This Application claims priority of Taiwan Patent Application No. 107137658, filed on Oct. 25, 2018, the entirety of which is incorporated by reference herein.

BACKGROUND OF THE INVENTION

Field of the Invention

The present invention relates to a power control circuit and a power control method and, in particular, to a power control circuit and power control method in which a control circuit device is controlled to operate in different operation status.

Description of the Related Art

DC power sources are predominantly used as input power sources for the electronic products that are currently on the market; consequently, power adapters are usually matched with the electronic products for converting AC power from the source to DC power which is supplied to the electronic product. However, as the market demand varies continually, the volume of the power adapters that are matched with the electronic products is becoming much smaller. The power of the power adapters has been greatly reduced for the electronic products. Although a power adapter with low Wattage can largely reduce the cost of production for manufacturers, a power adapter with low Wattage provides limited power to the electronic product. Nowadays, the lesson for efficiently using the power provided by the power adapter becomes more important.

Conventional techniques focus on improving the efficiency of power systems used in electronic products; for example, promoting the operating efficiency of the power converter in the power supply system; reducing the switching loss of the switches; or reducing the number of elements or components in the power supply system for the purpose of decreasing energy loss. However, the operating efficiency of conventional power converters is designed to reach 95%, and the configuration of the elements or components in conventional power supply systems is designed to achieve optimization. Thus, it is difficult to improve any further the effective use of the power from the power adapter for reducing unnecessary loss. As a result, efficient management of the power supplied to electronic products has become an important technological development in order to solve the problems mentioned above. The present invention proposes a new power control circuit and method in order to achieve more efficient power management for promoting the efficient use power by electronic products. In this way, the problems mentioned above can be solved.

BRIEF SUMMARY OF THE INVENTION

In view of this, the present invention proposes a power control circuit and method applied to the circuit device having a first function and a second function. For the purpose of reducing power loss, the power control circuit and method make the circuit device effectively manage the status of power usage.

A power control circuit is configured to control a circuit device to turn on or off a first function or a second function. The power control circuit comprises a detect device, a first control device and a second control device. The detect device is coupled to a DC power source and the circuit device and generates a detect signal based on a power of the DC power source. The first control device is coupled to the detect signal and monitors a variation of the detect signal corresponding to a first voltage and a second voltage. The second voltage is lower than the first voltage. When the detect signal is changed from lower to higher than the first voltage, an output of the first control device is changed from a first potential to a second potential. When the detect signal is changed from higher to lower than the second voltage, the output of the first control device is changed from the second potential to the first potential, wherein the second potential is higher than the first potential. The second control device is coupled to the detect signal and monitors variations in the detect signal corresponding to a third voltage and a fourth voltage, wherein the fourth voltage is lower than the third voltage. When the detect signal is changed from lower to higher than the third voltage, an output of the second control device is changed from a third potential to a fourth potential. When the detect signal is changed from higher to lower than the fourth voltage, the output of the second control device is changed from the fourth potential to the third potential, wherein the fourth potential is higher than the third potential. According to the first potential and the second potential from the first control device, the circuit device turns on or off the first function. According to the third potential and the fourth potential from the second control device, the circuit device turns on or off the second function. The third potential is lower than the first potential, and the fourth potential is higher than the second potential.

A power control method is executed by a power control circuit for controlling a circuit device to turn on or off a first function or a second function. The power control method comprises detecting a current value of a DC power source for generating a detect signal. When the detect signal is detected to have changed from lower to higher than a first voltage, an output of a first control device is changed from a first potential to a second potential, wherein the second potential is higher than the first potential. When the detect signal is detected to have changed from higher to lower than a second voltage, the output of the first control device is changed from the second potential to the first potential. When the detect signal is detected to have changed from lower to higher than a third voltage, an output of a second control device is changed from a third potential to a fourth potential, wherein the fourth potential is higher than the third potential. When the detect signal is detected to have changed from higher to lower than a fourth voltage, the output of the second control device is changed from the fourth potential to the third potential. According to the first potential and the second potential from the first control device, the circuit device turns on or off the first function. According to the third potential and the fourth potential from the second control device, the circuit device turns on or off the second function. The third voltage is lower than the first voltage. The third voltage is higher than the fourth voltage. The fourth voltage is higher than the second voltage.

DETAILED DESCRIPTION OF THE INVENTION

The present invention is described with reference to the attached figures, where like reference numerals are used throughout the figures to designate similar or equivalent elements. The figures are not drawn to scale and are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details, or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

The following description is an embodiment of the present invention. The purpose of the present invention is to exemplify the general principles of the invention and should not be construed as limiting the scope of the invention, which is defined by the scope of the claims.

By matching with the power adapter, most of the present electronic products can retrieve enough power for operation, such as laptops, tablet and so on. However, the volume of a power adapter is designed to become smaller so that the power provided by the power adapter becomes smaller. The power conversion circuit in the present electronic products is configured to have at least two functional switches in order to make the power conversion circuit be operated in different modes, such as charging function or throttling function etc. According to the functional switches being turned on or off, the power conversion circuit is capable to be operated in different modes. For example, when the power conversion circuit turns on the charging function and turns off the throttling function, the power conversion circuit can provide high power to the electronic products. When the power conversion circuit turns off the charging function and turns on the throttling function, the power provided by the power conversion circuit is decreased. This design can make electronic products to use power source efficiently. This design also protects the hardware of the electronic products from being burnt down because of receiving high power for a long time.

In traditional, because a computing device (such as personal computer, laptop) controls the power conversion circuit, the method for turning on or off the functional modes of the power conversion circuit can be implemented. In additional, a power control circuit is provided in the electronic product for controlling power conversion circuit, and the conventional power control circuit contains at least one central processing unit (CPU) or microprocessor control unit (MCU) etc. The power control circuit having CPU causes some deficiencies to the electronic product, such as high cost, complicated design and so on. Consequently, the present invention provides a power control circuit without CPU or MCU to control the power conversion circuit. The technical contents of the present invention are described in detail as shown below.

Figure 1:
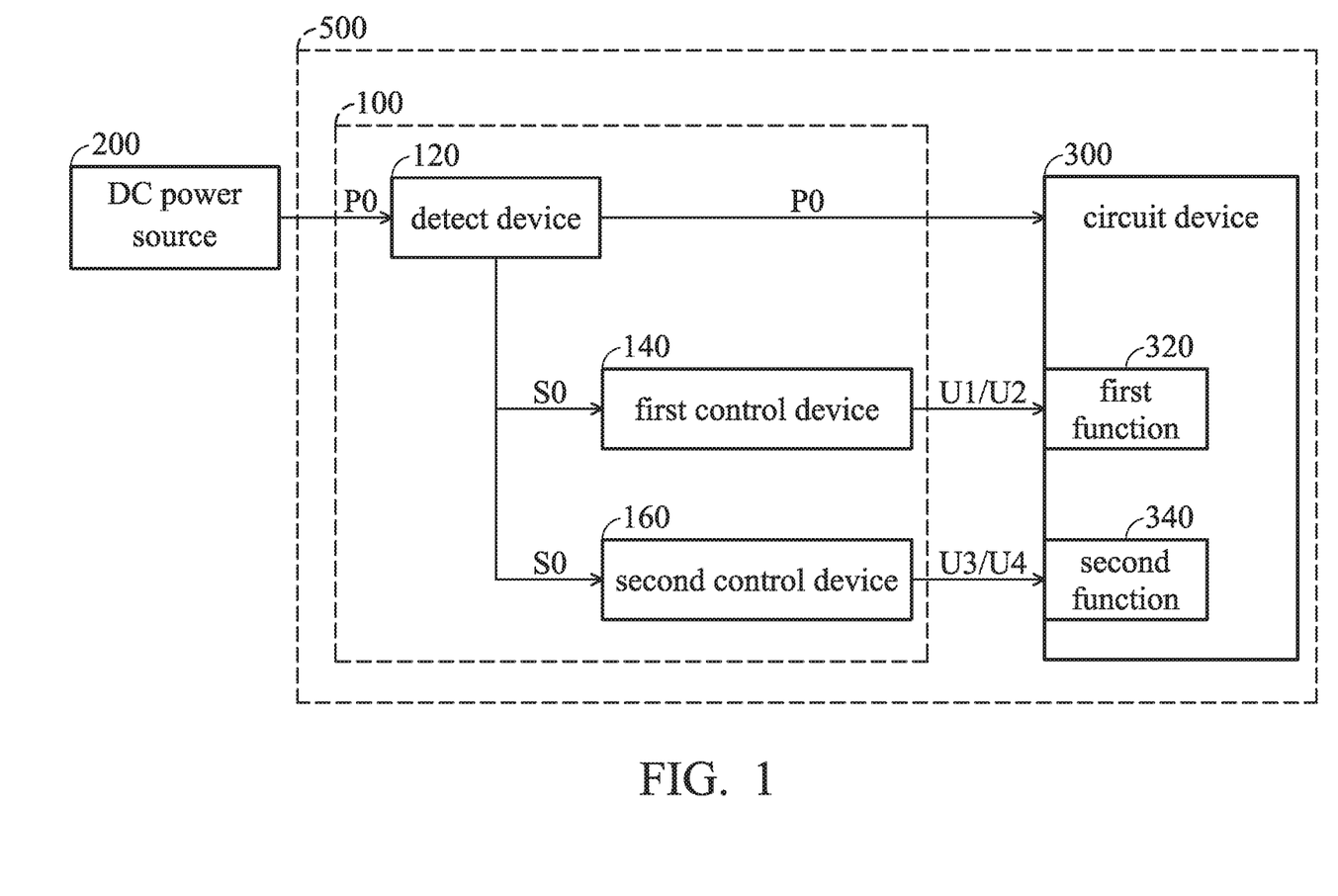
FIG. 1 depicts a block diagram of a power control circuit applied to an electronic device, in accordance with one embodiment of the present invention.

FIG. 1 depicts a block diagram of a power control circuit 100 applied to an electronic device 500, in accordance with one embodiment of the present invention. In an embodiment, the electronic device 500 includes a power control circuit 100 and a circuit device 300. In this example, the circuit device 300 is a power supply circuit, but the disclosure is not limited to this. The power control circuit 100 is used for controlling circuit device 300 to turn on or off a first function 320 or a second function 340. The power control circuit 100 includes a detect device 120, a first control device 140 and a second control device 160. When the DC power source 200 provides power to the electronic device 500, the detect device 120 generates the detect signal S0 based on the power P0 output by the DC power source 200. The first control device 140 receives the detect signal S0 and detects the voltage variation of detect signal S0. According to the voltage variation of the detection signal S0, the first control device 140 changes the output signal from the first potential U1 to the second potential U2 or the second potential U2 to the first potential U1. The second control device 160 receives the detect signal S0 and detects the voltage variation of the detect signal S0. According to the voltage variation of the detection signal S0, the second control device 160 changes the output signal from the third potential U3 to the fourth potential U4 or the fourth potential U4 to the third potential U3. The circuit device 300 turns on or off the first function 320 based on the first potential U1 or the second potential U2 which are the output signal of the first control device 140. The circuit device 300 turns on or off the second function 340 based on the third potential U3 or the fourth potential U4 which are the output signal of the second control device 160.

In some embodiments, the detect device 120 in the power control circuit 100 is configured to detect the power P0 output by DC power source 200. Thus, the detect device generally includes a voltage detect device and a current detect device for acquiring power P0. In practical application, DC power source 200 can be provided by the power adapter, but the present disclosure is not limited to this. The one having ordinary skill in the art can comprehend that the output voltage of the power adapter is rated voltage. As a result, under this condition that the output of the DC power source 200 is rated voltage, the output current of the DC power source 200 is simply detected for calculating the power P0 of the DC power source. Therefore, in some embodiments, the detect device 120 can be current detect devices or components, such as Hall Sensors, current detect chips, resistors or other current sensors. However, the present invention is not limited to this.

The detect device 120 in the power control circuit 100 is used for not only detecting the power output of the DC power source 200 and for outputting the detect signal S0, but also delivering the power P0 output of the DC power source 200 to the circuit device 300. As a result, the circuit device 300 receives the power for operating normally.

In this embodiment, the circuit device 300 mainly functions to convert the power P0 from the DC power source 200 and provide the power to any load devices. The power conversion device is usually provided in the circuit device 300, such as a DC-DC converter, inverter or uninterruptible power system (UPS) etc. For promoting the usage efficiency of power, the circuit device 300 is configured to have distinct functions and different operational statuses for providing different forms of power to loads; for example, a throttling function (the first function 320) and a charging function (the second function 340). However, the present invention is not limited to this. For instance, the circuit device 300 enables the charging function to charge the secondary battery (such as lithium battery, lead-acid battery and so on). In the charging process, when the secondary battery is fully charged, the circuit device 300 turns off the charging function. However, if capacity reduction of the secondary battery results from the secondary battery providing power to any load device, the circuit device 300 can turn on the charging function again. On the other hand, if the secondary battery does not provide power to any device, even though the circuit device 300 turns off the charging function, the current supplied by the circuit device 300 may still increase. Therefore, the circuit device 300 turns on the throttling function to prevent the secondary battery from being damaged due to overcharging.

The circuit device 300 turns on or off the first function 320 based on the first potential U1 or the second potential U2 which are the output signal of the first control device 140. The circuit device 300 turns on or off the second function 340 based on the third potential U3 or the fourth potential U4 which are the output signal of the second control device 160. In the present invention, when the first function 320 receives the second potential U2 output by the first control device 140, the circuit device 300 turns on the first function 320. When the first function 320 receives the first potential U1 output by the first control device 140, the circuit device 300 turns off the first function 320. When the second function 340 receives the third potential U3 output by the second control device 160, the circuit device 300 turns on the second function 340. When the second function 340 receives the fourth potential U4 output by the second control device 160, the circuit device 300 turns off the second function 340. The conditions of turning on or off the first function 320 and the second function 340 can be differently configured by the setting of firmware of circuit device 300. Furthermore, due to the different application requirements, the conditions of turning on or off the first function 320 and the second function 340 also can have different configurations. Thus, about this embodiment, it is merely an example, but is not intended to limit the present invention.

Figure 2:
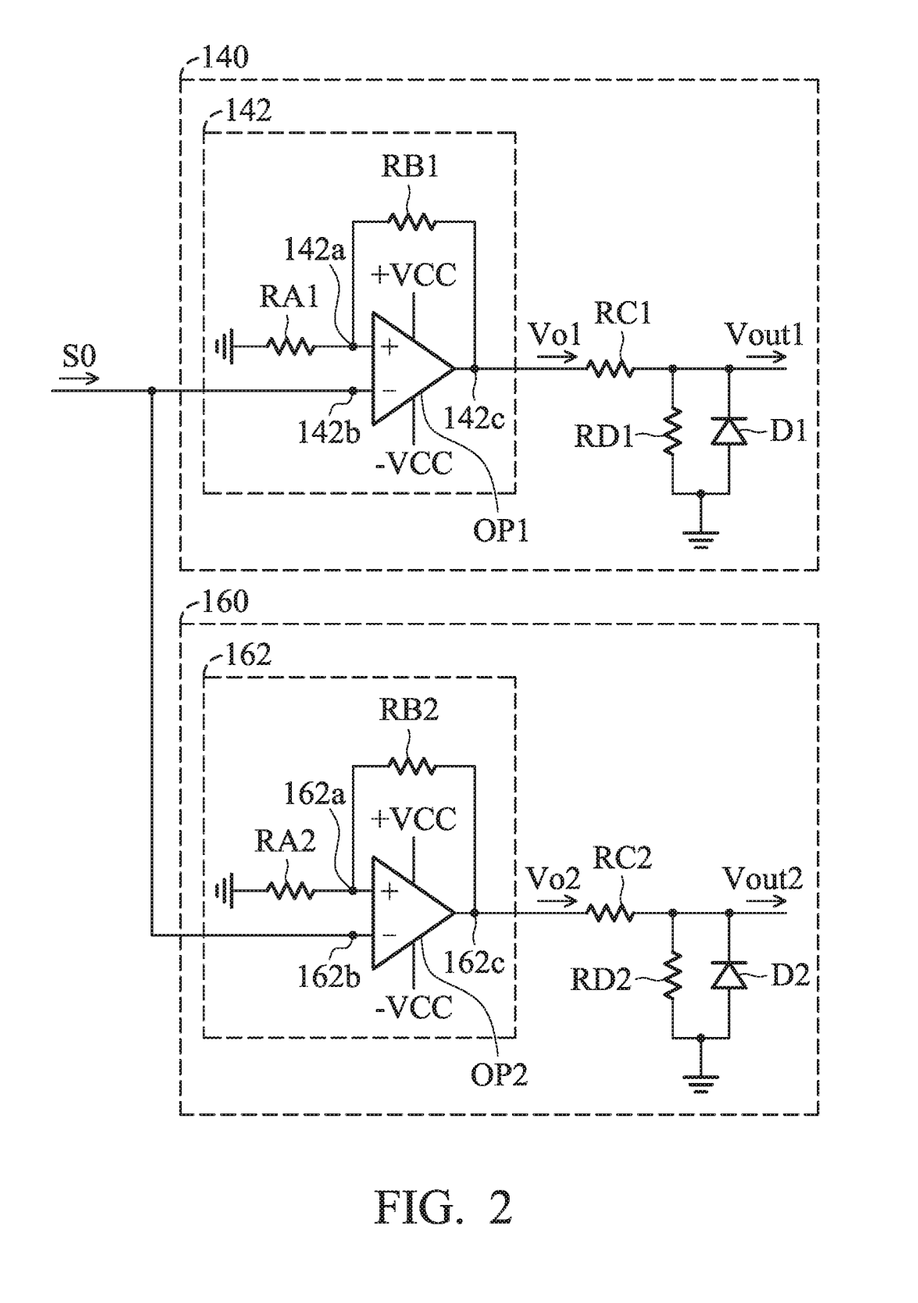
FIG. 2 depicts a circuit diagram of the first control device in the power control circuit, in accordance with one embodiment of the present invention.

FIG. 2 depicts a circuit diagram of the first control device 140 in the power control circuit 100, in accordance with one embodiment of the present invention. Please refer to FIG. 1 and FIG. 2. After the first control device 140 receives the detect signal S0, the output voltage Vout1 is changed to the first potential U1 or the second potential U2 based on variations in the detect signal S0. In FIG. 2, the first control device 140 includes a first hysteresis circuit 142. The first hysteresis circuit 142 has a hysteresis bandwidth. According to the voltage variation of the detect signal S0, the potential of the output voltage Vout1 is switched by the hysteresis bandwidth of the first hysteresis circuit 142. The operation characteristics of the first hysteresis circuit 142 are described in detail as shown below.

Figure 3:
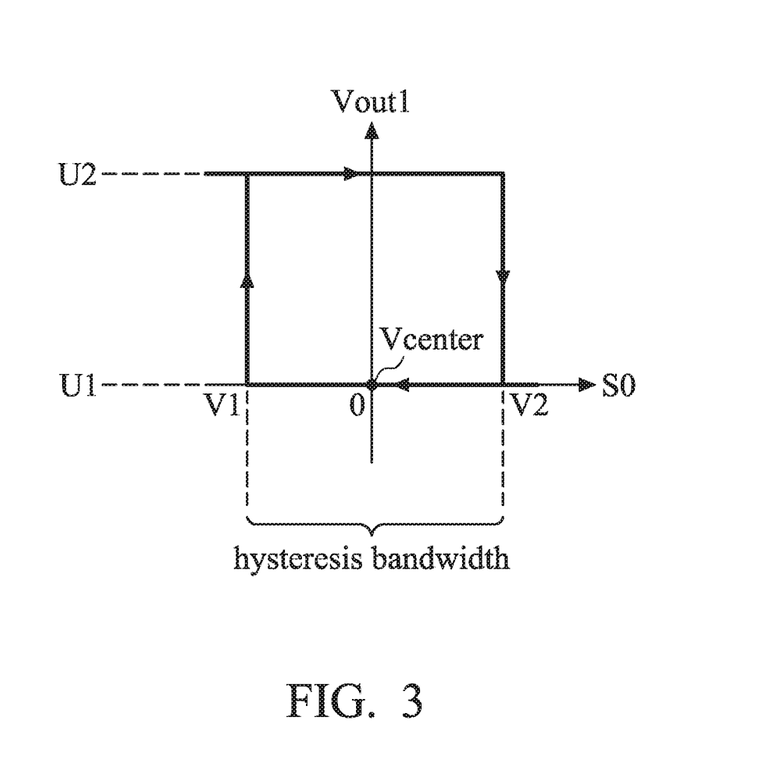
FIG. 3 depicts an output/input relationship diagram for the first control device in the power control circuit, in accordance with one embodiment of the present invention.

FIG. 3 depicts an output/input relationship diagram for the first control device 140 in the power control circuit 100, in accordance with one embodiment of the present invention. Please refer to FIG. 2 and FIG. 3. The first control device 140 has the hysteresis bandwidth, and the hysteresis bandwidth is defined by the first voltage V1 and the second voltage V2. When the detect signal S0 received by the first control device 140 is changed to be higher than the second voltage V2, the first hysteresis circuit 142 in the first control device 140 changes the output voltage Vout1 from the second potential U2 to the first potential U1. When the detect signal S0 received by the first control device 140 is changed to be lower than the first voltage V1, the first hysteresis circuit 142 in the first control device 140 changes the output voltage Vout1 from the first potential U1 to the second potential U2. If the detect signal S0 received by the first control device 140 is changed between the first voltage V1 and the second voltage V2, the first hysteresis circuit 142 in the first control device 140 does not change the potential of the output voltage Vout1. As a result, upon the value of the detect signal S0 is between the first voltage V1 and the second voltage V2, if the potential of the output voltage Vout1 is the second potential U2, the output voltage Vout1 consistently remains the second potential U2. When the value of the detect signal S0 is between the first voltage V1 and the second voltage V2, if the potential of the output voltage Vout1 is the first potential U1, the output voltage Vout1 consistently remains the first potential U1. The operation principal for the potential variation of output voltage Vout1 changed by the first hysteresis circuit 142 in the first control device 140 will be described in detail as shown below.

Please refer to FIG. 2 and FIG. 3. The first hysteresis circuit 142 in the first control device 140 has an operational amplifier OP1, wherein the operational amplifier OP1 is connected with the positive power terminal +Vcc and the negative power terminal −Vcc. The positive input terminal 142*a* of the operational amplifier OP1 is coupled to the resistance RA1 and the resistance RB1, and the negative input terminal 142*b* of the operational amplifier OP1 is used for receiving the detect signal S0. The output terminal 142*c* of the operational amplifier OP1 is coupled to the resistance RB1 and the resistance RC1. According to the connection manner of the operational amplifier OP1 described above, it can be derived that the first hysteresis circuit 142 has a hysteresis bandwidth characteristic:

$$V1 = \frac{RA1}{RA1+RB1} \times (-Vcc)$$

$$V2 = \frac{RA1}{RA1+RB1} \times (+Vcc)$$

According to the mathematical relationship between the first voltage V1 and the second voltage V2 described above, it can be understood that the values of the first voltage V1 and the second voltage V2 can be adjusted by resistances RA1 and RB1 when the positive power terminal +Vcc and the negative power terminal −Vcc remain constant. Thus, according to the actual demands, the first control device 140 can change the hysteresis bandwidth of the first hysteresis circuit 142 by adjusting the values of the resistances RA1 and RB1.

In FIG. 2 and FIG. 3, the first potential U1 of the output voltage Vout1 of the first control device 140 is closed to zero, but the present invention is not limited to this. However, according to the first hysteresis circuit 142 shown as FIG. 2, it can be derived that the output voltage Vout1 is equal to +Vcc. Consequently, after the output voltage Vo1 of the first hysteresis circuit 142 is divided by the resistance RC1 and RD1, the second potential U2 of the output voltage Vout1 of the first control device 140 is derived as shown below:

$$U2 = \frac{RD1}{RC1+RD1} \times (+Vcc)$$

According to the mathematical relationship of the second potential U2 described above, it can be understood that the value of the second potential U2 can be determined by resistances RC1 and RD1 when the positive power terminal +Vcc remains constant. Consequently, the first control device 140 can change the value of the second potential U2 by adjusting the resistances RC1 and RD1, wherein the second potential U2 is the output voltage Vout1 which is output by the first control device 140. In addition, the component D1 in the first control device 140 is a voltage stabilizing component. In this embodiment, a Zener diode is taken as an example, but it is not intended to limit the present invention.

In the present invention, the second control device 160 in the power control circuit 100 includes a second hysteresis circuit 162, and the second hysteresis circuit 162 further includes an operational amplifier OP2, and the circuit structure and the connection manner for the operational amplifier OP2 are identical with the first control circuit 140. Since the circuit principle is identical, it will not be repeatedly described here. As shown in FIG. 3, the output waveform diagram of the second control device 160 is identical with the first control device 140, but the parameters in the second control device 160 are distinct from the parameters in the first control device 140. For simplifying the illustration of the second control device 160, the first voltage V1 in FIG. 3 is changed to the third voltage V3. The second voltage V2 is changed to the fourth voltage V4. Furthermore, the output voltage Vout1 in FIG. 3 is changed to the output voltage Vout2. According to the above description and FIG. 2, the second control device 160 includes a second hysteresis circuit 162, and the second hysteresis circuit 162 receives the detect signal S0. The second hysteresis circuit 162 detects the voltage variation of the detect signal S0. When the detect signal S0 is changed from lower to higher the third voltage V3, the output of the second control device 160 is changed from the third potential U3 to the fourth potential U4. When the detect signal S0 is changed from higher to lower the fourth voltage V4, the output of the second control device 160 is changed from the fourth potential U4 to the third potential U3, wherein the fourth potential U4 is higher than the third potential U3.

As shown in FIG. 2, the second hysteresis circuit 162 in the second control device 160 has an operational amplifier OP2, wherein the operational amplifier OP2 is connected with the positive power terminal +Vcc and the negative power terminal −Vcc. The positive input terminal 162a of the operational amplifier OP2 is coupled to the resistance RA2 and the resistance RB2, and the negative input terminal 162b of the operational amplifier OP2 is used for receiving the detect signal S0. The output terminal 162c of the operational amplifier OP2 is coupled to the resistance RB2 and the resistance RC2. According to the connection manner of the operational amplifier OP2 described above, the third voltage V3 and the fourth voltage V4 of the second control device 160 can be derived as shown below:

$$V3 = \frac{RA2}{RA2+RB2} \times (-Vcc)$$

$$V4 = \frac{RA2}{RA2+RB2} \times (+Vcc)$$

Identical to the first control device 140, the hysteresis bandwidth is formed by a third voltage V3 and a fourth voltage V4 produced by the second hysteresis circuit 162 in the second control device 160. According to the values of the third voltage V3 and the fourth voltage V4, the hysteresis bandwidth of the second control device 160 is adjustable. When the positive power terminal +Vcc and the negative power terminal −Vcc are constant, the values of the third voltage V3 and the fourth voltage V4 can be changed by resistances RA2 and RB2. Therefore, the second control device 160 can change the hysteresis bandwidth of the second hysteresis circuit 162 by adjusting resistance RA2 and RB2 based on requirements.

In FIG. 2, similar to the operation principle of the first control device 140, the third potential U3 of the output voltage of the second control device 160 is approximately zero, and the fourth potential U4 is:

$$U4 = \frac{RD2}{RC2+RD2} \times (+Vcc)$$

According to the mathematical relationship of the fourth potential U4, it can be understood that when the positive power terminal +Vcc is a constant value, the value of the fourth potential U4 can be changed by dividing the voltage through the resistances RC2 and RD2. According to the different requirements, the value of the fourth potential U4 can be determined by resistances RC2 and RD2. Consequently, the second control device 160 can change the value of the fourth potential U4 by adjusting the resistances RC1 and RD1, wherein the fourth potential U4 is the output voltage Vout2 which is output by the second control device 160. In addition, the component D2 in the second control device 160 is a voltage stabilizing component. In this embodiment, a Zener diode is taken as an example, but it is not intended to limit the present invention.

In some embodiments of the present invention, the parameters of the first control device 140 and the second control device 160 are designed for satisfying the conditions of turning on or off the first function 320 and the second function 340 in the circuit device 300. Furthermore, the parameters of the first control device 140 and the second control device 160 are also designed to have a different trigger time for avoiding the first function 320 and the second function 340 from being operated simultaneously. The parameters are designed as shown below: the second potential U2 is higher than the first potential U1. The fourth potential U4 is higher than the third potential U3. The third voltage V3 is lower than the first voltage V1. The third voltage V3 is higher than the fourth voltage V4. The fourth voltage V4 is higher than the second voltage V2. This design can ensure the first function 320 and the second function 340 to be turned on or off at the appropriate time, but the present invention is not limited to this.

Figure 4:
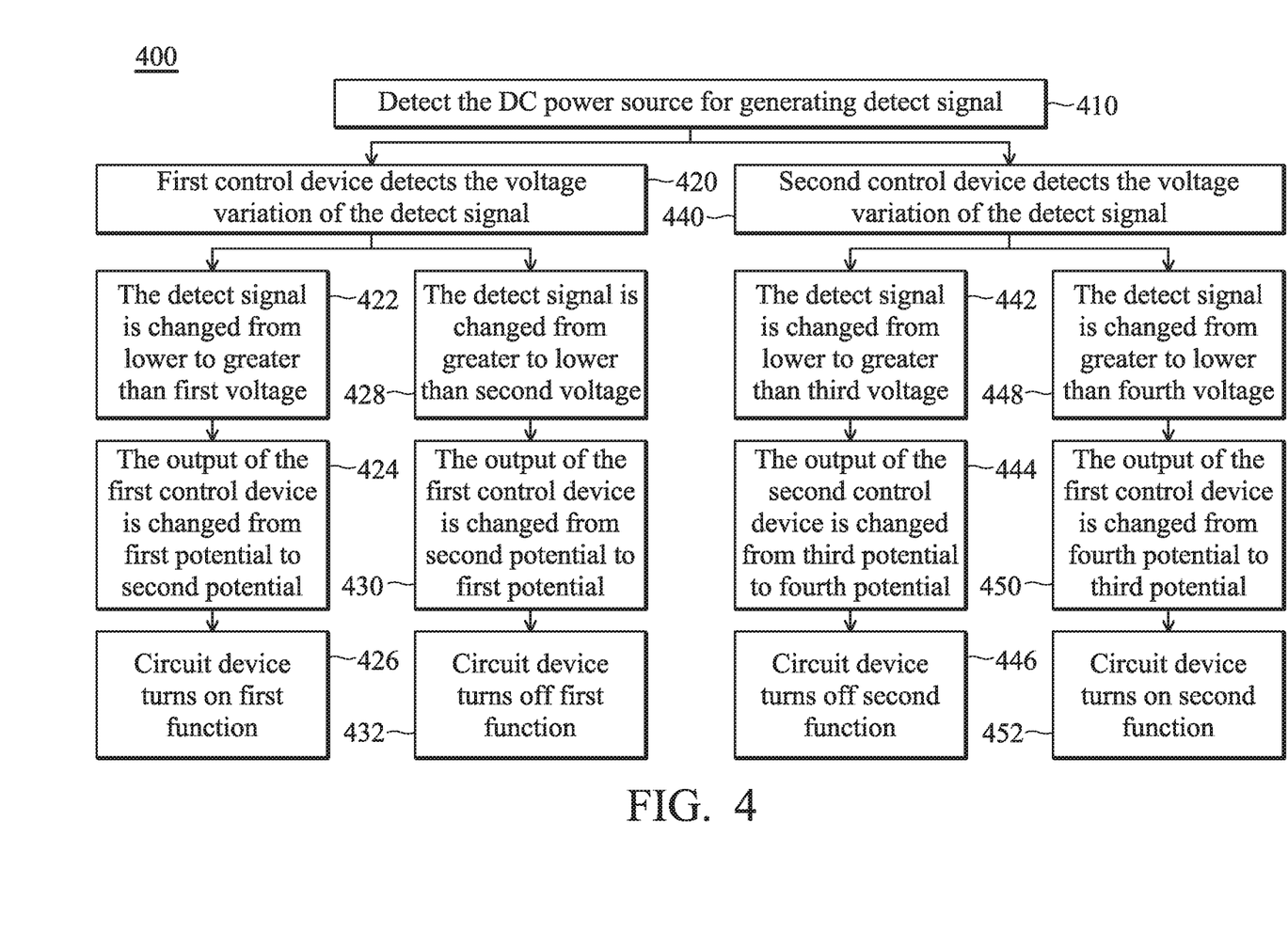
FIG. 4 is a flowchart of the method for the power control circuit, in accordance with one embodiment of the present invention.

FIG. 4 is a flowchart of the method 400 for the power control circuit, in accordance with one embodiment of the present invention. Please refer to FIG. 1 for illustrating of the method 400. The power control method 400 is executed by the power control circuit 100 for controlling the circuit device 300 to turn on or off the first function 320 and the second function 340. In the method 400, the step 410 is initially executed: the current value of the DC power source 200 is detected in order to produce the detect signal S0; afterwards, and then the step 420 and the step 440 are executed by the power control circuit 100 simultaneously. In this embodiment, the current value can be considered as the power P0 output by DC power source 200 in FIG. 1.

In step 420, the first control device 140 detects variations in detect signal S0, and decides to execute the step 422 or 428 depending on variations in detect signal S0. When the step 422 is executed, the first control device 140 detects that the detect signal S0 is changed from lower to higher than the first voltage V1. When the step 428 is executed, the first control device 140 detects that the detect signal S0 is changed from higher to lower than the second voltage V2.

After the power control device 100 completes the step 422, the power control device 100 executes the step 424. The output of the first control device 140 is changed from the first potential U1 to the second potential U2. After the completion of the step 424, the power control device 100 executes the step 426. In the step 426, according to the second potential U2 output by the first control device 140, the circuit device 300 turns on the first function 320.

If the power control circuit 100 executes the step 430 after the completion of the step 428, the output of the first control device 140 is changed from the second potential U2 to the first potential U1. After the completion of the step 430, the power control device 100 executes the step 432. In step 432, according to the first potential U1 output by the first control device 140, the circuit device 300 turns off the first function 320.

When the step 440 is executed by the power control device 100, the second control device 160 detects variations in the detect signal S0. Then, according to variations in the detect signal S0, the power control device 100 determines to execute the steps 442 or 448 separately. When the step 442 is executed, the second control device 160 detects that the detect signal S0 is changed from lower to higher than the third voltage V3. When the step 448 is executed, the second control device 160 detects that the detect signal S0 is changed from higher to lower than the fourth voltage V4.

After the power control device 100 completes the step 442, the power control device 100 executes the step 444. The output of the second control device 160 is changed from the third potential U3 to the fourth potential U4. After the completion of the step 444, the power control device 100 executes the step 446. In the step 446, according to the fourth potential U4 output by the second control device 160, the circuit device 300 turns off the second function 340.

If the power control circuit 100 executes the step 450 after the completion of the step 448, the output signal of the second control device 160 is changed from the fourth potential U4 to the third potential U3. After the completion of the step 450, the power control device 100 executes the step 452. In step 452, according to the third potential U3 output by the second control device 160, the circuit device 300 turns on the second function 340.

In this embodiment, because the method 400 is designed for preventing the first function 320 and the second function 340 from being operated simultaneously, the parameters in the first control device 140 and the second control device 160 are designed to have a different trigger time. The parameters are designed as shown below: the second potential U2 is higher than the first potential U1. The fourth potential U4 is higher than the third potential U3. The third voltage V3 is lower than the first voltage V1. The third voltage V3 is higher than the fourth voltage V4. The fourth voltage V4 is higher than the second voltage V2. This design can ensure the first function 320 and the second function 340 to be turned on or off at the appropriate time, but the present invention is not limited to this.

In summary, FIG. 1 and FIG. 2 show that the power control circuit 100 can detect the power P0 output by the DC power source 200 and turn on or off the first function 320 and the second function 340, in accordance with the value of the power P0. However, as shown in FIG. 3, the design makes the central voltage Vcenter of the hysteresis bandwidth of the first control device 140 and the second control device 160 is located on the vertical axis of the coordinate axis (this is at voltage 0). Consequently, the power control circuit 100 with the design is limited to detect the DC power source 200 with lower power. In the case of a DC power source 200 having a large power, the power control circuit 100 shown in FIG. 1 and FIG. 2 will be inappropriately applied to the case. The other embodiments of the power control circuit 100 will be described in detail as shown below for making the power control circuit 200 to be applied for the DC power source 200 with the wider range of value of power P0.

Figure 5:
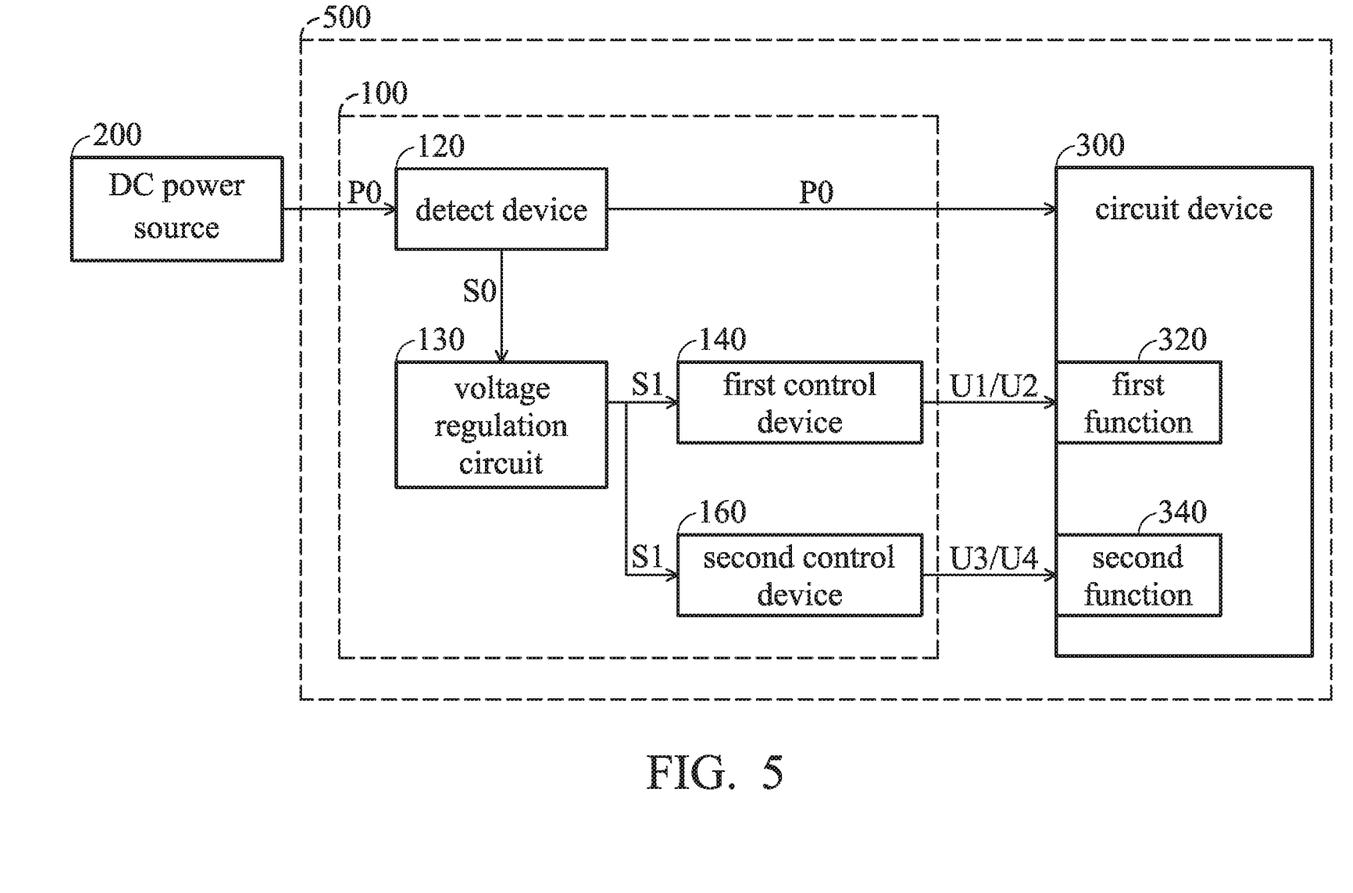
FIG. 5 depicts a block diagram of a power control circuit applied to an electronic device, in accordance with another embodiment of the present invention.

FIG. 5 depicts a block diagram of a power control circuit 100 applied to an electronic device 500, in accordance with another embodiment of the present invention. When the DC power source 200 outputs the power source having large power, the range of variations in detect signal S0 becomes larger for the limitation from the specification design of the current sense device (such as Hall sensor). In FIG. 2 and FIG. 3, the hysteresis bandwidth of the first control device 140 and the second control device 160 in the power control circuit 100 cannot be used appropriately so that the first function 320 and the second function 340 of the circuit device 300 cannot be adjusted effectively for the purpose of promoting efficiency. Therefore, in the embodiment shown in FIG. 5, a voltage regulation circuit 130 configured in the power control circuit 100 makes the hysteresis bandwidth of the first control device 140 and the second control device 160 capable of being adjusted flexibly depending on the actual requirements. The principal of the voltage regulation circuit 130 will be described in detail as shown below.

As shown in FIG. 5, the power control circuit 100 includes: detect device 120, a voltage regulation circuit 130, a first control device 140 and a second control device 160. When the DC power source 200 supplies the power to the electronic device 500, the detect device 120 is used to receive the DC power source 200. According to the power P0 output by the DC power source 200, the detect device 120 produces the detect signal S0 to the voltage regulation circuit 130. The circuit device 300 receives the DC power source 200 by the detect device 120. According to the detect signal S0, the voltage regulation circuit 130 outputs a control signal S1 to the first control device 140 and the second control device 160. The first control device 140 receives the control signal S1 and detects the voltage variation of the control signal S1, According to the voltage variation of the control signal S1, the output signal from the first control device 140 is changed from a first potential U1 to a second potential U2 or from a second potential U2 to a first potential U1. The second control device 160 receives the control signal S1 and detects the voltage variation of the control signal S1. According to the voltage variation of the control signal S1, the output signal from the second control device 160 is changed from a third potential U3 to a fourth potential U4 or from a fourth potential U4 to a third potential U3. According to the output signal from the first control device 140 is the first potential U1 or the second potential U2, the circuit device 300 turns on or off the first function 320. According to the output signal from the second control device 160 is the third potential U3 or the fourth potential U4, circuit device 300 turns on or off the second function 340.

Figure 6:
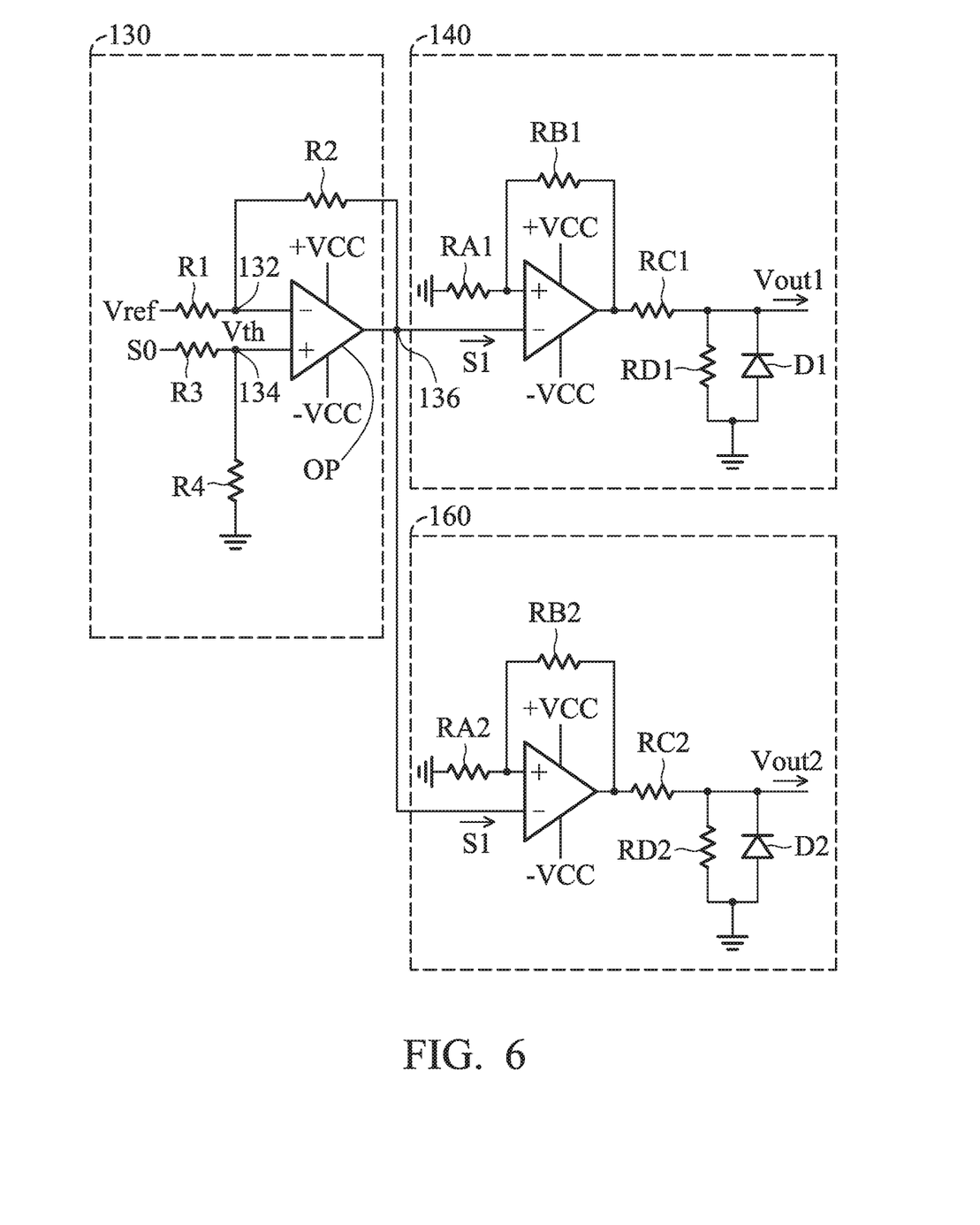
FIG. 6 depicts a circuit diagram of the partial circuits in the power control circuit, in accordance with another embodiment of the present invention.

FIG. 6 depicts a circuit diagram of the partial circuits in the power control circuit 100, in accordance with another embodiment of the present invention. Please refer to FIG. 5 and FIG. 6. The voltage regulation circuit 130 includes an operational amplifier OP, wherein the operational amplifier OP is connected with the positive power terminal +Vcc and the negative power terminal −Vcc, and the negative input terminal 132 of the operational amplifier OP is coupled to the resistance R1 and resistance R2, and the resistance R1 is coupled to a reference voltage Vref. The positive input terminal 134 of the operational amplifier OP coupled to the resistance R3 is used to receive the detect signal S0. The output terminal of the operational amplifier OP is coupled to the resistance R2, the first control device 140 and the second control device 160. According to the connection manner of the operational amplifier OP described above, the equation of the control signal S1 output by the voltage regulation device 130 is derived as shown below:

$$S1 = \left(1 + \frac{R2}{R1}\right) \cdot \left(\frac{R4}{R3 + R4}\right) S0 - \frac{R2}{R1} Vref$$

Figure 7:
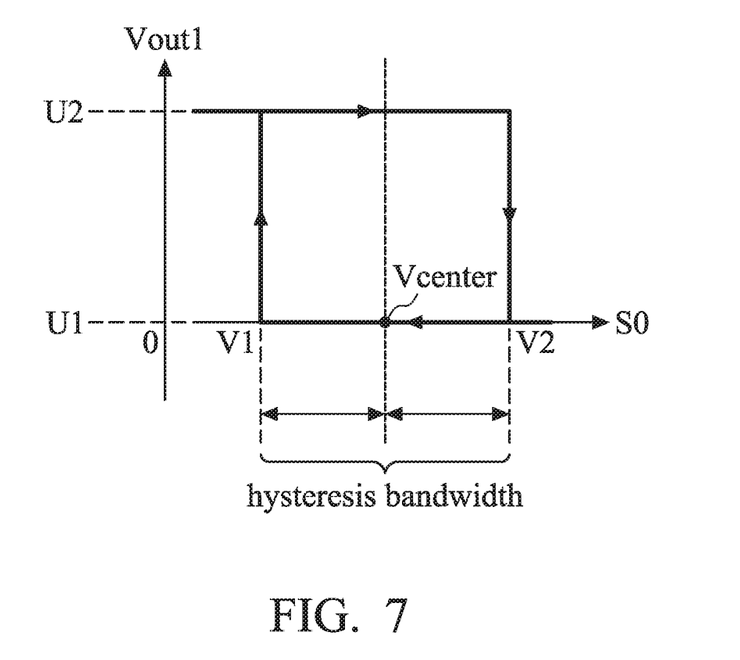
FIG. 7 depicts an output/input relationship diagram for the partial circuits in the power control circuit, in accordance with one embodiment of the present invention.

FIG. 7 depicts an output/input relationship diagram for the partial circuits in the power control circuit 100, in accordance with one embodiment of the present invention. Please refer to FIG. 6 and FIG. 7. FIG. 7 is the output/input relation diagram for the first control device 140 coupled to the voltage regulation device 130. According to the design of the voltage regulation device 130, the central voltage Vcenter of the hysteresis bandwidth in the first control device 140 is moved to the right (to be more than 0 volt). The equation for the central voltage Vcenter of the hysteresis bandwidth is:

$$Vcenter = \frac{V1 + V2}{2} = \frac{R2}{R1} \times Vref$$

According to the description as above, the operation modes of the second control device 160 coupled to the voltage regulation device 130 are identical with the first control device 140, so the operation modes of the second control device 160 are not described again. In summary, the voltage regulation device 130 configured in the power control circuit 100 makes the design of the hysteresis bandwidth of the first control device 140 and the second control device 160 become more flexible. The value of the central voltage Vcenter of the hysteresis bandwidth is adjustable based on the resistances R1, R2 in the voltage regulation device 130. Thus, the hysteresis bandwidth can be adjusted to the most appropriate range. This design's advantage is that the power control circuit 100 can be applied to the wider range of output power from the DC power source 200.

Figure 8:
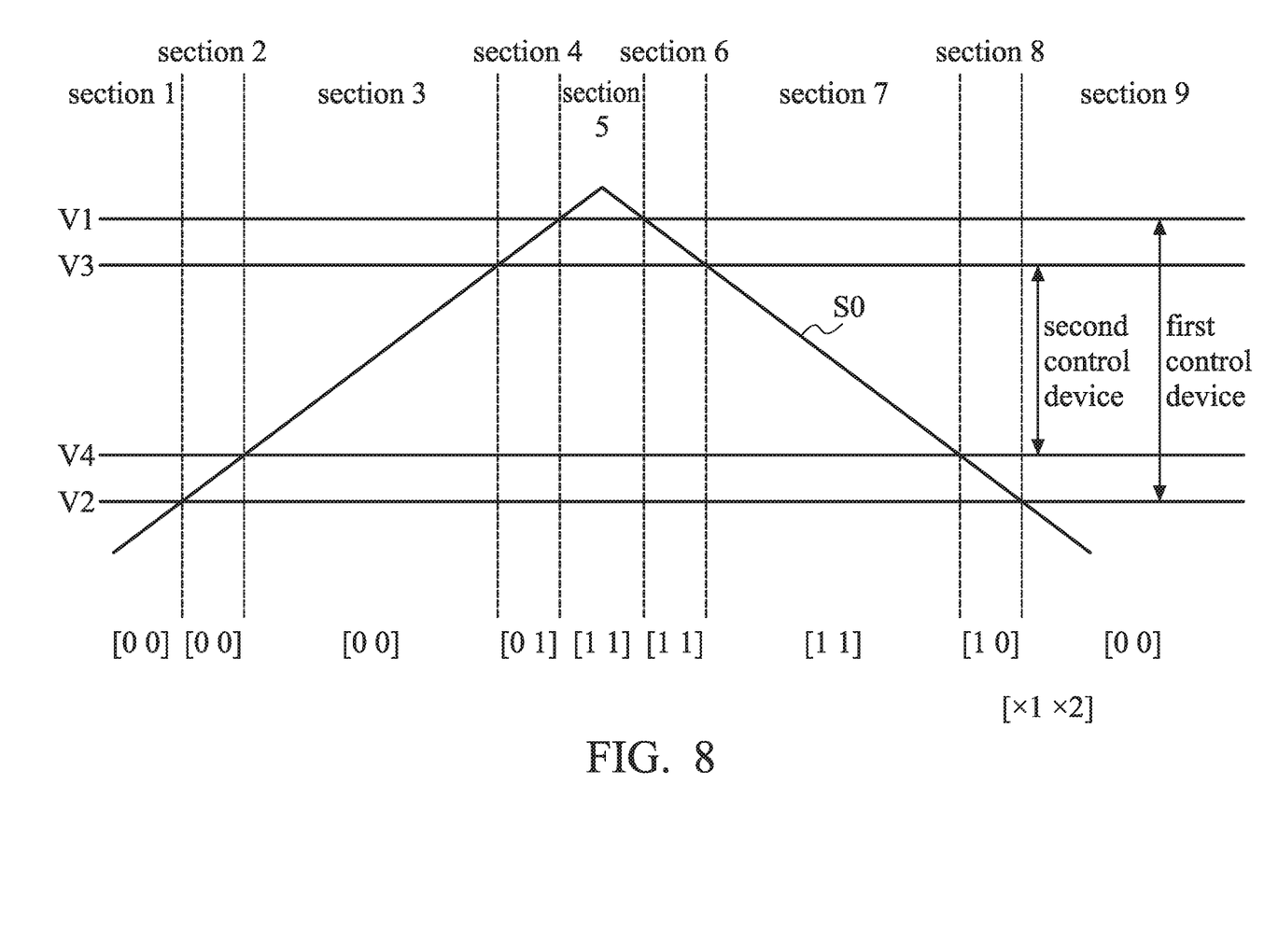
FIG. 8 is a signal variation diagram of the power control circuit, in accordance with one embodiment of the present invention.

FIG. 8 is a signal variation diagram of the power control circuit 100, in accordance with one embodiment of the present invention. Please also refer to FIG. 1 and FIG. 3 for illustrating FIG. 8. The waveform shown in FIG. 8 is the detect signal S0 output by the detect device 120 based on the power of the DC power source 200. Wherein the first voltage V1 and the second voltage V2 are the boundary of hysteresis bandwidth defined in the first control device 140. The third voltage V3 and the fourth voltage V4 are the boundary of hysteresis bandwidth defined in the second control device 160. For facilitating to illustrate the output status of the first control device 140 and the second control device 160, the bracket [x1 x2] in FIG. 8 represents the different output status. Wherein the x1 is the logic value corresponding to the output voltage Vout1 of the first control device 140. For example, the first potential U1 is "0", and the second potential U2 is "1". The x2 is the logic value corresponding to the output voltage Vout2 from the second control device 160. For example, the third potential U3 is "0", and the fourth potential U4 is "1". For facilitating to illustrate FIG. 8, the first function 320 in FIG. 1 is the throttling function, and the second function 340 in FIG. 1 is the charging function. The waveform of the detect signal S0, the first to fourth voltage V1~V4, and the first to fourth potential U1~U4 are simply exemplified for facilitating to illustrate the present invention, but the present invention is not limited to this. In this embodiment, take the secondary battery (such as lead-acid battery, lithium battery, nickel-hydrogen battery, and zinc-manganese battery) which receives the power from the circuit device 300 control by the power control circuit 100 as an example, but the present invention is not limited to this.

In FIG. 8, in the initial section (section 1), during the process that the detect signal S0 is gradually increased, the first control device 140 outputs the logic 0 and the second control device 160 outputs the logic 0. Therefore, the circuit device 300 turns off the throttling function (the first function 320) and turns on the charging function (the second function 340). The circuit device 300 charges the secondary battery with the largest power during this section, and the power P0 of the DC power source is continually increased so that the output power of the circuit device 300 and the detect signal S0 are also increased continually. At this time, the operation status of the circuit device 300 is not changed until the detect signal S0 is gradually increased to the third voltage V3 (section 4).

When the detect signal S0 is increased to the third voltage V3 (segment 4), the output logic of the first control device 140 remains "0", and the output logic of the second control device 160 is switched from "0" to "1". The circuit device 300 still turns off the throttling function (the first function 320) but turns off the charging function (the second function 340). At this time, because the detect device 120 detects that the power P0 of the DC power source 200 is too large, the circuit device 300 turns off the charging function in order to prevent the secondary battery from overcharging. However, because the secondary battery is possibly not fully charged so that the secondary battery receives the power continuously, the power P0 of the DC power source 200 continues to be increased until the detect signal S0 is raised to the first voltage V1. When the detect signal S0 is increased to the first voltage V1, the power provided by the circuit device 300 is too high so that the secondary battery may be in high-risk state. Therefore, the operation status of the circuit device 300 must be changed to reduce the output power of the circuit device 300.

When the detect signal S0 is increased to the first voltage V1 (section 5), the output logic of the first control device 140 is switched from "0" to "1", and the output logic of the second control device 160 remains "1". The circuit device 300 turns on the throttling function (the first function 320) and still turns off the charging function (the second function 340). At this time, because the detect device 120 detects that the power P0 of the DC power source 200 which exceeds the rated input power of the secondary battery, the circuit device 300 turns off the throttling function in order to prevent the excessive input power from damaging the secondary battery. During this operation status, the circuit device 300 makes the power P0 of the DC power source 200 be increased in short time and start to decrease. If the secondary battery is consistently discharging at this time, the detect signal S0 will be decreased to the fourth voltage V4.

When the detect signal S0 is increased to the fourth voltage V4 (section 8), the output logic of the first control device 140 remains "1", and the output logic of the second control device 160 is switched from "1" to "0". At this time, the circuit device 300 continuously turns on the throttling function (the first function 320) but recovers the charging function (the second function 340). At this time, because the detect device 120 detects that the power P0 of the DC power source 200 is too low so that the secondary battery is possibly over discharge, the circuit device 300 turns on the charging function for preventing the secondary battery from discharging too quickly. If the secondary battery is discharged too quickly, the capacity of the secondary battery may be over discharge. The circuit device 300 possibly makes the power P0 of the DC power source 200 to be increase during this operation status. However, if the secondary battery is continuously discharged for a large amount of power at this time, the power P0 of the DC power source 200 will be continually decreased so that the detect signal S0 will be continually decreased to the second voltage V2.

When the detect signal S0 is increased to the second voltage V2 (section 9), the output logic of the first control device 140 is still switched from "1" to "0", and the output logic of the second control device 160 is kept at "0". At this time, the circuit device 300 continuously turns off the throttling function and continuously turns on the charging function. At this time, because the detect device 120 detects that the power P0 of the DC power source 200 is too low, the secondary battery is damaged by excessive discharge of the secondary battery. In order to prevent this condition, the circuit device 300 turns off the throttling function to charge the secondary battery with a large current for increasing the capacity of the secondary battery. During this operation status, the circuit device 300 induces the power P0 of the DC power source 200 to be decreased in a short time and begin to be risen.

It is noted that the first control device 140 has a hysteresis bandwidth between the first voltage V1 and the second voltage V2. Therefore, the output logic value of the first control device 140 does not be changed between the first voltage V1 and the second voltage V2. The hysteresis bandwidth of the second control device 160 is between the third voltage V3 and the fourth voltage V4. Therefore, the output logic value of the second control device 160 does not be changed between the third voltage V3 and the fourth voltage V4.

It can be known that the circuit device 300 operates differently depending on the different logic values output by the power control circuit 100. In the present invention, the circuit device 300 has four operation statuses, such as a first operation status [0 0], a second operation status [0 1], a third operation status [1 1], and a fourth operation status [1 0], but the invention is not limited thereto. The switching situation of the four operation statuses of the circuit device 300 will be described in detail as shown below.

Figure 9:
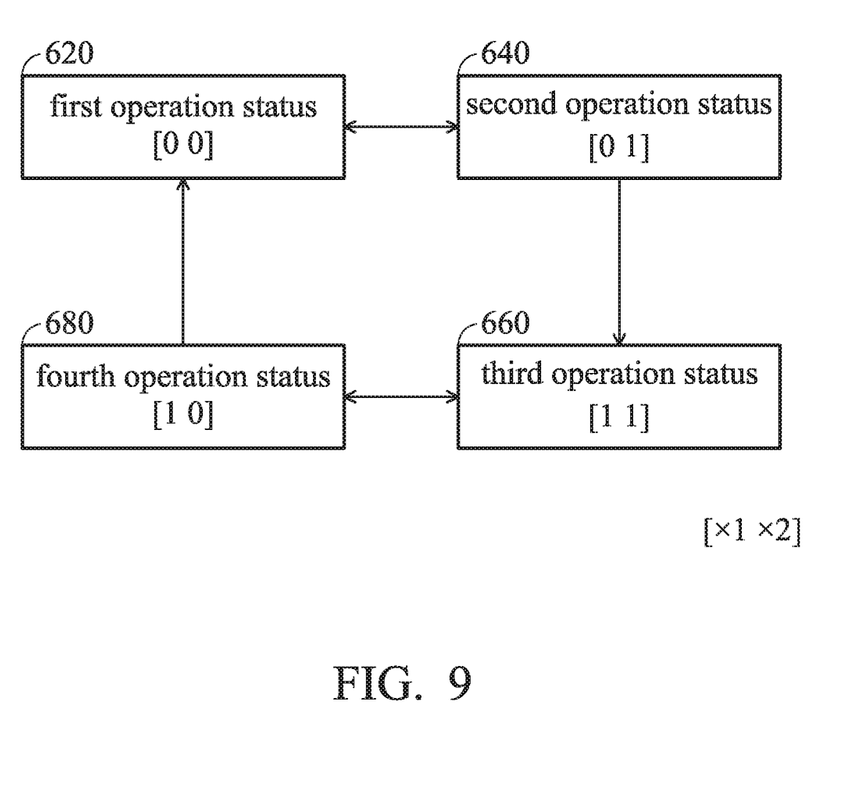
FIG. 9 is a diagram for showing the power control device controls circuit device to operate in different operation status, in accordance with one embodiment of the present invention.

FIG. 9 is a diagram for showing the power control device 100 controls circuit device 300 to operate in different operation status, in accordance with one embodiment of the present invention. Please refer to FIG. 1 and FIG. 3 for illustrating FIG. 9. For facilitating to illustrate the output status of the first control device 140 and the second control device 160, the bracket [x1 x2] in FIG. 8 represents the different output status. Wherein the x1 is the logic value corresponding to the output voltage Vout1 from the first control device 140. For example, the first potential U1 is "0", and the second potential U2 is "1". The x2 is the logic value corresponding to the output voltage Vout2 from the second control device 160. For example, the third potential U3 is "0", and the fourth potential U4 is "1". For facilitating to illustrate FIG. 9, the first function 320 in FIG. 1 is the throttling function, and the second function 340 in FIG. 1 is the charging function.

As shown in FIG. 9, the power control circuit 100 is able to control the circuit device 300 to operate in four operation statuses: a first operation status 620, a second operation status 640, a third operation status 660, and a fourth operation status 680. When the initial output status of the power control circuit 100 is [0 0], the circuit device 300 operates in the first operation status 620. At this time, the circuit device 300 turns off the throttling function (the first function 320) and turns off the charging function (the second function 340). When the circuit device 300 is changed from the first operation status 620 to the second operation status 640, the output status of the power control circuit 100 is changed from [0 0] to [0 1]. At this time, the circuit device 300 still keeps turning off the throttling function and turning off the charging function as well. When the circuit device 300 is changed from the second operation status 640 to the third operation status 660, the output status of the power control circuit 100 is changed from [0 1] to [1 1]. At this time, the circuit device 300 turns on the throttling function and turns off the charging function. When the circuit device 300 is changed from the third operation status 660 to the fourth operation status 680, the output status of the power control circuit 100 is changed from [1 1] to [1 0]. At this time, the circuit device 300 turns on the throttling function and turns on the charging function.

As shown in FIG. 9, because the operation status of the circuit device 300 is changed by the output signal of the power control circuit 100. Therefore, according to the output signal of the power control circuit 100, the change orientation can be adjusted for the operation status of the circuit device 300. For example, when the circuit device 300 is operated in the second operation status 640, the operation status of the circuit device 300 can be changed from the second operation status 640 to the third operation status 660 or the first operation status 620. When the circuit device 300 is operated in the fourth operation status 680, the operation status of the circuit device 300 can be changed from the fourth operation status 680 to the third operation status 660 or the first operation status 620. It is noted that when the circuit device 300 is operated in the first operation status 620, the operation status of the circuit device 300 can be only changed from the first operation status 620 to the second operation status 640 based on the output signal of the power control circuit 100. When the circuit device 300 is operated in the third operation status 660, the operation status of the circuit device 300 can be only changed from the third operation status 660 to the fourth operation status 680 based on the output signal of the power control circuit 100. The operation status of the circuit device 300 cannot be switched between the second operation status 640 and the fourth operation status 680 mutually, and the operation status of the circuit device 300 cannot be switched between the first operation status 620 and the third operation status 660 mutually.

While the invention has been described above in terms of a preferred embodiment, it is not intended to limit the scope of the invention, and it is to be understood by those of ordinary skill in the art without departing from the spirit and scope of the invention. Instead, the scope of the invention should be determined by the scope of the appended claims.

The terminology used herein is for the purpose of describing particular embodiments only and is not intended to limit the invention. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising."

What is claimed is:

1. A power control circuit for controlling a circuit device to turn on or off a first function or a second function, the power control circuit comprising:
    a detect device, coupled to a DC power source and the circuit device and generating a detect signal based on a power of the DC power source;
    a first control device, coupled to the detect signal and monitoring a variation of the detect signal corresponding to a first voltage and a second voltage, wherein the second voltage is lower than the first voltage, when the detect signal is changed from lower to higher than the first voltage, an output of the first control device is changed from a first potential to a second potential, when the detect signal is changed from higher to lower than the second voltage, the output of the first control device is changed from the second potential to the first potential, wherein the second potential is higher than the first potential; and
    a second control device, coupled to the detect signal and monitoring variations in the detect signal corresponding to a third voltage and a fourth voltage, wherein the fourth voltage is lower than the third voltage, when the detect signal is changed from lower to higher than the third voltage, an output of the second control device is changed from a third potential to a fourth potential, when the detect signal is changed from higher to lower than the fourth voltage, the output of the second control device is changed from the fourth potential to the third potential, wherein the fourth potential is higher than the third potential;
    wherein according to the first potential and the second potential from the first control device, the circuit device turns on or off the first function, and according to the third potential and the fourth potential from the second control device, the circuit device turns on or off the second function, and
    wherein the third potential is lower than the first potential, and the fourth potential is higher than the second potential.

2. The power control circuit of claim 1, wherein the first control device comprises a first hysteresis circuit, configured to generate the first voltage and the second voltage and monitor variations in the detect signal corresponding to the first voltage and the second voltage for changing the output of the first control device to be the first potential or the second potential.

3. The power control circuit of claim 1, wherein the second control device comprises a second hysteresis circuit, configured to generate the third voltage and the fourth voltage and monitor variations in the detect signal corresponding to the third voltage and the fourth voltage for changing the output of the second control device to be the third potential or the fourth potential.

4. The power control circuit of claim 1, wherein the detect device further comprises a current detector for detecting a current of the DC power source to output the detect signal corresponding to the power.

5. A power control method, executed by a power control circuit for controlling a circuit device to turn on or off a first function or a second function, wherein the power control method comprises:
    detecting a current value of a DC power source for generating a detect signal;
    when the detect signal is detected to have changed from lower to higher than a first voltage, an output of a first control device is changed from a first potential to a second potential, wherein the second potential is higher than the first potential;
    when the detect signal is detected to have changed from higher to lower than a second voltage, the output of the first control device is changed from the second potential to the first potential;
    when the detect signal is detected to have changed from lower to higher than a third voltage, an output of a second control device is changed from a third potential to a fourth potential, wherein the fourth potential is higher than the third potential; and
    when the detect signal is detected to have changed from higher to lower than a fourth voltage, the output of the second control device is changed from the fourth potential to the third potential;
    wherein according to the first potential and the second potential from the first control device, the circuit device turns on or off the first function, and according to the third potential and the fourth potential from the second control device, the circuit device turns on or off the second function; and
    wherein the third voltage is lower than the first voltage, the third voltage is higher than the fourth voltage, and the fourth voltage is higher than the second voltage.

* * * * *